United States Patent
Board et al.

(10) Patent No.: US 11,762,940 B2
(45) Date of Patent: Sep. 19, 2023

(54) COMPONENT LEVEL DATA MANAGEMENT AND STATE CHANGE DETECTION IN WEB APPLICATIONS FOR DATA LOSS PROTECTION

(71) Applicant: HCL America, Inc., Boca Raton, FL (US)

(72) Inventors: Nicholas Board, Cary, NC (US); Peter Kamenkovich, Boca Raton, FL (US); Asiyah Ahmad, Garner, NC (US); Heath Thomann, Apex, NC (US)

(73) Assignee: HCL America Inc.

( * ) Notice: Subject to any disclaimer, the term of this patent is extended or adjusted under 35 U.S.C. 154(b) by 0 days.

(21) Appl. No.: 17/019,211

(22) Filed: Sep. 12, 2020

(65) Prior Publication Data
US 2022/0083621 A1    Mar. 17, 2022

(51) Int. Cl.
G06F 16/957    (2019.01)
G06F 16/9035   (2019.01)
G06F 16/958    (2019.01)

(52) U.S. Cl.
CPC ...... *G06F 16/9577* (2019.01); *G06F 16/9035* (2019.01); *G06F 16/958* (2019.01); *G06F 16/9574* (2019.01)

(58) Field of Classification Search
CPC .............. G06F 16/9577; G06F 16/958; G06F 16/9574; G06F 16/9035
USPC ......................................................... 715/234
See application file for complete search history.

(56) References Cited

U.S. PATENT DOCUMENTS

| | | | | |
|---|---|---|---|---|
| 5,706,505 | A * | 1/1998 | Fraley | G06F 16/27 |
| 6,026,474 | A * | 2/2000 | Carter | H04L 67/02 |
| | | | | 711/E12.066 |
| 6,279,001 | B1 * | 8/2001 | DeBettencourt | G06F 11/0709 |
| 6,615,253 | B1 * | 9/2003 | Bowman-Amuah | |
| | | | | G06F 16/9574 |
| | | | | 709/219 |
| 6,654,784 | B1 * | 11/2003 | Wei | H04L 29/06 |
| | | | | 709/203 |
| 7,107,519 | B1 * | 9/2006 | Webster | G06F 40/18 |
| | | | | 715/212 |
| 7,130,895 | B2 * | 10/2006 | Zintel | H04L 12/2805 |
| | | | | 709/220 |

(Continued)

OTHER PUBLICATIONS

Shoemaker et al.; Redux: Why It's Good for You; Jan. 25, 2017; www.newline.co; 10 pages.*

(Continued)

*Primary Examiner* — Andrew R Dyer

(57) ABSTRACT

A method and system for component level data management in web applications is disclosed. In some embodiments, the method includes identifying a at least one component within a web application. The method further includes saving an initial state of the at least one component in a Redux store, tracking the at least one component being updated with data by a user, updating a current state of the at least one component being tracked in real-time in the Redux store, receiving a predefined action on the at least one component or the web application, determining whether the current state of the at least one component is updated in the Redux store, and generating a warning to the user in response to receiving the predefined action, when the current state of the at least one component is not updated in the Redux store.

13 Claims, 8 Drawing Sheets

(56) References Cited

U.S. PATENT DOCUMENTS

| | | | | |
|---|---|---|---|---|
| 7,284,193 B1* | 10/2007 | Lindhorst | | G06F 16/986 |
| | | | | 715/234 |
| 7,555,706 B2* | 6/2009 | Chapman | | G05B 15/02 |
| | | | | 715/234 |
| 8,413,047 B2* | 4/2013 | Vick | | G06F 40/221 |
| | | | | 715/237 |
| 8,640,224 B2* | 1/2014 | Ashida | | G06F 11/327 |
| | | | | 726/17 |
| 9,830,190 B1* | 11/2017 | Pfleger, Jr. | | G06F 16/188 |
| 10,025,702 B1* | 7/2018 | Karppanen | | G06F 12/0868 |
| 2002/0166118 A1* | 11/2002 | Kovan | | G06F 16/958 |
| | | | | 707/E17.116 |
| 2005/0108299 A1* | 5/2005 | Nakajima | | G06F 16/9574 |
| 2007/0234206 A1* | 10/2007 | Yamabuchi | | G06F 16/9577 |
| | | | | 715/210 |
| 2007/0283245 A1* | 12/2007 | Masood | | G06F 40/137 |
| | | | | 715/234 |
| 2013/0086020 A1* | 4/2013 | Addala | | G06F 16/958 |
| | | | | 707/705 |
| 2013/0086102 A1* | 4/2013 | Addala | | G06F 16/958 |
| | | | | 707/769 |
| 2013/0346704 A1* | 12/2013 | Burger | | G06F 16/9574 |
| | | | | 711/137 |
| 2014/0129920 A1* | 5/2014 | Sheretov | | H04L 63/20 |
| | | | | 715/234 |
| 2014/0281891 A1* | 9/2014 | Sulcer | | G06F 3/0484 |
| | | | | 715/234 |
| 2015/0178298 A1* | 6/2015 | Ish-Hurwitz | | G06F 16/954 |
| | | | | 715/234 |
| 2015/0331794 A1* | 11/2015 | Ren | | G06F 12/0833 |
| | | | | 709/214 |
| 2016/0070813 A1* | 3/2016 | Unter Ecker | | G06F 8/38 |
| | | | | 715/234 |
| 2016/0259695 A1* | 9/2016 | Hosaka | | G06F 12/0868 |
| 2017/0329706 A1* | 11/2017 | Nemawarkar | | G06F 3/0605 |
| 2018/0268075 A1* | 9/2018 | Karpenko | | G06F 16/9577 |
| 2019/0386939 A1* | 12/2019 | Christian | | H04L 67/02 |
| 2020/0019414 A1* | 1/2020 | Byard | | G06F 21/629 |
| 2021/0349946 A1* | 11/2021 | Liu | | G06F 9/3838 |
| 2022/0079714 A1* | 3/2022 | Paraketsov | | G06T 17/20 |

OTHER PUBLICATIONS

Abramov et al.; Getting Started with Redux; Jan. 8, 2020; Redux.js.org; 8 pages.*

* cited by examiner

802 — User Login
- User Name: XYZ (802a)
- Password: @123abc (802b)
- Forget your password?
- [Login]

804 — Basic Details:
- Name: John
- Birth Date: March ▼ 07 ▼ 1999 ▼
- Gender: ☑ Male ☐ Female
- Mobile No.: 1234567893
- E-mail: abc1@gmail.com
- Address:
- [Save] [Reset]

806 — Additional Details:
- Photo [Upload]
- Choice of Instrument: Guitar ▼
- Days for Class: ☑ Monday ☐ Tuesday ☑ Wednesday ☐ Thursday ☑ Friday ☐ Saturday ☐ Sunday
- Start Date: Month ▼ Date ▼ Year ▼
- Class Time: Hours ▼ Minutes ▼ AM ▼
- Comments:
- [Save] [Reset] [Submit]

COMPONENT LEVEL DATA MANAGEMENT AND STATE CHANGE DETECTION IN WEB APPLICATIONS FOR DATA LOSS PROTECTION

TECHNICAL FIELD

Generally, the invention relates to web applications. More specifically, the invention relates to a method and system for component level data management in web applications.

BACKGROUND

Today, various JavaScript frameworks including REACT™, ANGULAR™, VUE™ or the like, are used for developing web applications. A web application may include a plurality of components. In most web applications, there is a dependency between various components. However, for better data management, one component of the web application should ideally not depend on other components. In other words, each of the plurality of components should be independent and isolated. This however seems difficult, especially where the components are associated with each other in a parent-child relationship. Since in the child-parent relationship, each child component depends on a parent component.

Various conventional methods and systems are available for managing data in web applications. However, the conventional methods may not handle data at component-level. Further, the conventional systems may experience difficulties such as, code duplication, destroying state of the components when external or internal operations are performed, trouble in detecting external or internal operations, inconvenience in keeping track of initial state, or frequently generating errors or warning message. Additionally, some of the conventional systems may not automatically save state of the component upon construction of a component.

Therefore, there is a need to develop a method and system that may automatically and efficiently manage data at component level.

SUMMARY OF INVENTION

In one embodiment, a method for component level data management in web applications is disclosed. The method may include identifying at least one component within a web application. The method may further include saving an initial state of the at least one component in a Redux store and tracking the at least one component being updated with data by a user. The method may further include updating, in real-time in the Redux store, a current state of the at least one component being tracked. It should be noted that the current state of the at least one component may include the data updated by the user. The method may further include receiving a predefined action on the at least one component or the web application and determining whether the current state of the at least one component is updated in the Redux store, in response to receiving the predefined action. The method may further include generating a warning to the user in response to receiving the predefined action, when the current state of the at least one component is not updated in the Redux store.

In another embodiment, a system for component level data management in web applications is disclosed. The system may include a processor and a memory communicatively coupled to the processor. The memory may store processor-executable instructions, which, on execution, may cause the processor to identify at least one component within a web application. The processor-executable instructions, on execution, may further cause the processor to save an initial state of the at least one component in a Redux store and track the at least one component being updated with data by a user. The processor-executable instructions, on execution, may further cause the processor to update, in real-time in the Redux store, a current state of the at least one component being tracked. It should be noted that the current state of the at least one component may include the data updated by the user. The processor-executable instructions, on execution, may further cause the processor to receive a predefined action on the at least one component or the web application and determine whether the current state of the at least one component is updated in the Redux store, in response to receiving the predefined action. The processor-executable instructions, on execution, may further cause the processor to generate a warning to the user in response to receiving the predefined action, when the current state of the at least one component is not updated in the Redux store.

In yet another embodiment, a non-transitory computer-readable medium storing computer-executable instruction for component level data management in web applications is disclosed. The stored instructions, when executed by a processor, may cause the processor to perform operations including identifying at least one component within a web application. The operations may further include saving an initial state of the at least one component in a Redux store and tracking the at least one component being updated with data by a user. The operations may further include updating, in real-time in the Redux store, a current state of the at least one component being tracked. It should be noted that the current state of the at least one component may include the data updated by the user. The operations may further include receiving a predefined action on the at least one component or the web application and determining whether the current state of the at least one component is updated in the Redux store, in response to receiving the predefined action. The operations may further include generating a warning to the user in response to receiving the predefined action, when the current state of the at least one component is not updated in the Redux store.

It is to be understood that both the foregoing general description and the following detailed description are exemplary and explanatory only and are not restrictive of the invention, as claimed.

BRIEF DESCRIPTION OF THE DRAWINGS

The present application can be best understood by reference to the following description taken in conjunction with the accompanying drawing figures, in which like parts may be referred to by like numerals.

FIG. 8 illustrates a scenario depicting restoration of dirty or unsaved data in a component within a web application on premature closure of the component, in accordance with an exemplary embodiment.

DETAILED DESCRIPTION OF THE DRAWINGS

The following description is presented to enable a person of ordinary skill in the art to make and use the invention and is provided in the context of particular applications and their requirements. Various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and devices are shown in block diagram form in order not to obscure the description of the invention with unnecessary detail. Thus, the invention is not intended to be limited to the embodiments shown, but is to be accorded the widest scope consistent with the principles and features disclosed herein.

While the invention is described in terms of particular examples and illustrative figures, those of ordinary skill in the art will recognize that the invention is not limited to the examples or figures described. Those skilled in the art will recognize that the operations of the various embodiments may be implemented using hardware, software, firmware, or combinations thereof, as appropriate. For example, some processes can be carried out using processors or other digital circuitry under the control of software, firmware, or hard-wired logic. (The term "logic" herein refers to fixed hardware, programmable logic and/or an appropriate combination thereof, as would be recognized by one skilled in the art to carry out the recited functions.) Software and firmware can be stored on computer-readable storage media. Some other processes can be implemented using analog circuitry, as is well known to one of ordinary skill in the art. Additionally, memory or other storage, as well as communication components, may be employed in embodiments of the invention.

Figure 1:
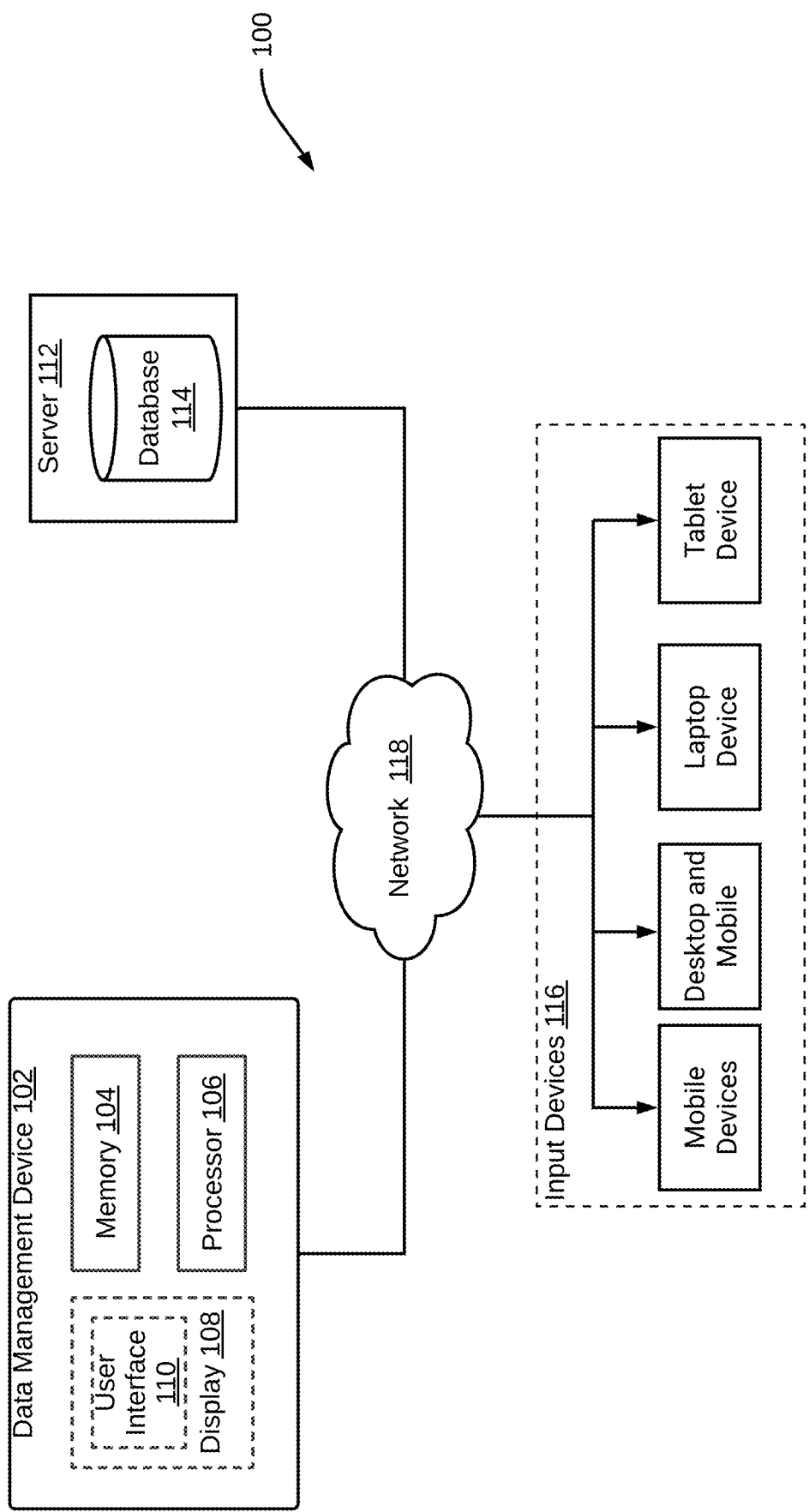
FIG. 1 is a block diagram illustrating a system for component level data management in web applications, in accordance with an embodiment.

Referring now to FIG. 1, a block diagram of a system 100 for component level data management in web applications is illustrated, in accordance with an embodiment. The system 100 may include a data management device 102 that may manage data of one or more components within a web application. For component level data management, continuous tracking of the one or more components may be performed by the data management device 102. Further, a Redux store within the data management device 102 may be updated with change of state of each of one or more component. This is further explained in detail in conjunction with FIG. 2 to FIG. 8.

Examples of the data management device 102 may include, but are not limited to, a server, a desktop, a laptop, a notebook, a tablet, a smartphone, a mobile phone, an application server, or the like. The data management device 102 may include a memory 104, a processor 106, and a display 108. The display 108 may further include a user interface 110. A user, or an administrator may interact with the data management device 102 and vice versa through the display 108. By way of an example, the display 108 may be used to display results of analysis performed by the data management device 102, to the user. By way of another example, the user interface 110 may be used by the user to provide inputs to the data management device 102. Thus, for example, in some embodiments, the data management device 102 may ingest a predefined action, and a user action provided by the user or the administrator via the user interface 110. Further, for example, in some embodiments, the data management device 102 may render results to the user/administrator via the user interface 110.

The data management device 102 may render a message related to successful updating of the current state of a component to the user via the user interface 110. Otherwise, a warning may be generated by the data management device 102 and provided to the user/administrator, when the current state of the component is not updated. In some embodiments, the user/administrator may provide inputs to the data management device 102 via the user interface 110.

The memory 104 may store instructions that, when executed by the processor 106, may cause the processor 106 to manage data at component level within the web application, in accordance with some embodiments. As will be described in greater detail in conjunction with FIG. 2 to FIG. 8, in order to provide component level data management, the processor 106 in conjunction with the memory 104 may perform various functions including identifying a component, tracking a component, storing various states of a component, receiving a user action, updating a Redux store, and generating a warning.

The memory 104 may also store various data (for example, various states of the component, and data filled in various data-fields of a component, a user action) that may be captured, processed, and/or required by the data management device 102. The memory 104 may be a non-volatile memory (for example, flash memory, Read Only Memory (ROM), Programmable ROM (PROM), Erasable PROM (EPROM), Electrically EPROM (EEPROM) memory, etc.) or a volatile memory (e.g., Dynamic Random Access Memory (DRAM), Static Random-Access memory (SRAM), etc.)

Further, the data management device 102 may interact with a server 112 or input devices 116 over a communication network 118 for sending and receiving various data. The communication network 118, for example, may be any wired or wireless communication network and the examples may include, but may be not limited to, the Internet, Wireless Local Area Network (WLAN), Wi-Fi, Long Term Evolution (LTE), Worldwide Interoperability for Microwave Access (WiMAX), and General Packet Radio Service (GPRS).

By way of an example, in some embodiments, the data management device 102 may receive the pre-defined action from the server 112. The server 112 may further include a database 114, which may store information related to various web applications. Further, examples of the input devices 116 may include, but may not be limited to, a desktop, a laptop, a notebook, a netbook, a tablet, a smartphone, a mobile phone, or another computing system/device.

Figure 2:
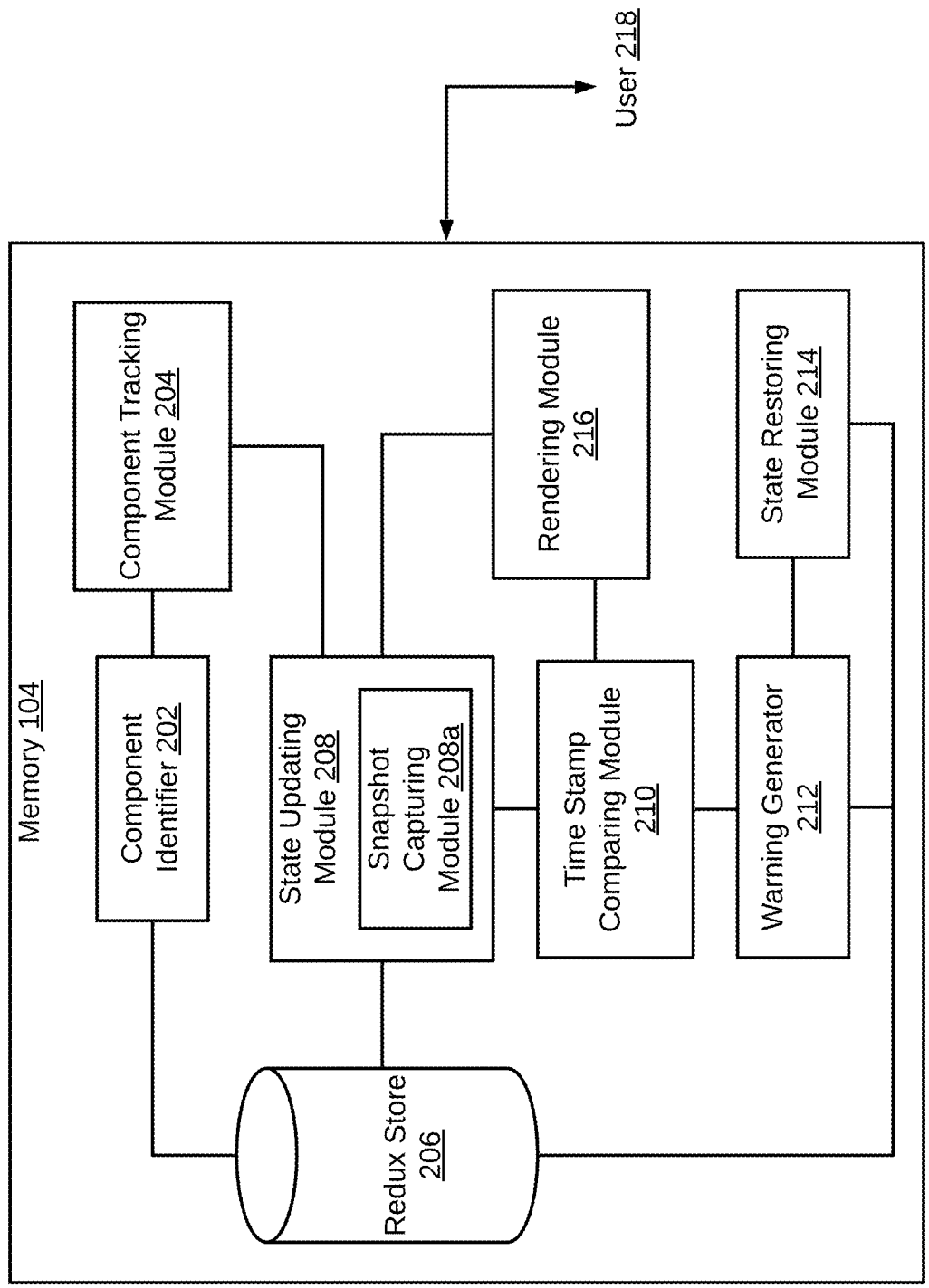
FIG. 2 is a block diagram of various modules within a memory of a data management device configured to manage data at component level in web applications, in accordance with an embodiment.

Referring now to FIG. 2, a block diagram of various modules within the memory 104 of the data management device 102 configured to manage data at component level in web applications is illustrated, in accordance with an embodiment. For component level data management, the memory 104 of the data management device 102 may include a component identifier 202, a component tracking module 204, a Redux store 206, a state updating module 208, a time stamp comparing module 210, a warning generator 212, a state restoring module 214, and a rendering module 216.

The component identifier 202 of the data management device 102 may be configured to identify a plurality of component within the web application. The component identifier 202 may be communicatively coupled to the component tracking module 204 and the Redux store 206. The component identifier 202 may be configured to share as well as receive data from the component tracking module 204 and the Redux store 206.

The component tracking module 204 may be configured to track each of the plurality of components identified by the component identifier 202. In other words, the component tracking module 204 may continuously monitor each of the plurality of components. In case, a change in state of a component occurs, the component tracking module 204 may transmit such information to the state updating module 208. A user 218 may be responsible for the change in state of that component. The change in state of the component may correspond to change in data filled in various data fields within the component. By way of an example, the component may be part of an online form and the data being in various fields within the online form may include details of the user 218. Moreover, when an initial state of the component is modified into another state, associated information that lead to the change in state may be transmitted to the state updating module 208. It will be apparent to a person skilled in the art that the component tracking module 204 may track more than one component of the web application, simultaneously.

The redux store 206 may be configured to store the initial state of the component. Additionally, a current state of the component being tracked may also be stored (or updated) in the redux store 206. The current state of the component may include the data updated by the user 218. Here, the redux store 206 may be used with a framework including at least one of REACT, ANGULAR, VUE, EMBER, OR VANILLA JAVASCRIPT. In an embodiment, the Redux store 206 may initially be empty until called upon for storing.

The state updating module 208 may be communicatively coupled to the component tracking module 204, the redux store 206, the time stamp comparing module 210, and the rendering module 216. The state updating module 208 may receive the information of state change from the component tracking module 204 and may, in-real time, update the current state of the component in the redux store 206. To this end, the state updating module 208 may include a snapshot capturing module 208, which may take snapshots of each state of the component and snapshot of each such state may be further stored in the redux store 206.

The time stamp comparing module 210 may be configured to check whether the current state of the component is updated successfully in the redux store 206 or not. Whenever, the user 218 performs a predefined action on the component, the state of the component may get changed and that changed state may be required to be updated every time in the redux store 206. By way of an example, the predefined action may be at least one of navigating from a current page to another page within the web application, redirecting to an initial page, leaving one or more data fields blank in the at least one component, applying an inappropriate format to fill the one or more data fields, directly closing a tab or a browser in the web application, activating browser reload buttons, or activating browser back and forth buttons.

To this end, the time stamp comparing module 210 may compare time stamps of two different states of the component. In some embodiments, the time stamp comparing module 210 may compare a time stamp associated with a latest state updated in the Redux store 206 with a time stamp associated with the current state of the component. In case, the current state of the component is not updated successfully in the Redux store 206, the time stamp comparing module 210 may update the current state in the Redux store 206 and may additionally transmit a signal to the warning generator 212, if the user performs a predefined action and the current state is not updated in the Redux store 206. Otherwise, a signal indicating the that the Redux store 206 has been successfully updated may be transmitted to the rendering module 216.

The warning generator 212 may be configured to receive the signal transmitted by the time stamp comparing module 210. In response to the signal, the warning generator 212 may generate a warning and may inform the user 218. The warning may be generated, when the current state of the component is not updated in the Redux store 206 and the user 218 performs one of the predefined actions.

After transmitting the warning to the user 218, the data management device 102 may receive a user action in response to the warning. In some embodiments, the warning may be accepted, and the user 218 may undo the predefined action. In some other embodiments, the warning may be ignored by the user 218. When the user 218 ignores the warning, the component may get closed.

The state restoring module 214 may be configured to restore the updated current state of the component as stored in the Redux store 206. The state restoring module 214 may receive a request to reopen the component that was closed when the warning was ignored by the user 218. In response to the request, the state restoring module 214 may restore the state that was last updated for the component in the Redux store 206. In some embodiments, the user may provide the request to the data management device 102 for reopening the component.

In some embodiments, the rendering module 216 may render a message to the user 218. The message may include information associated with successful updating of the current state of the component in the Redux store 206. Additionally, in some other embodiments, the rendering module 216 may render a warning note to the user 218, when the current state of the component is not yet stored (or updated) in the Redux store 206.

It should be noted that the data management device 102 may be implemented in programmable hardware devices such as programmable gate arrays, programmable array logic, programmable logic devices, or the like. Alternatively, the data management device 102 may be implemented in software for execution by various types of processors. An identified engine/module of executable code may, for instance, include one or more physical or logical blocks of computer instructions which may, for instance, be organized as an object, module, procedure, function, or other construct. Nevertheless, the executables of an identified engine/module need not be physically located together but may include disparate instructions stored in different locations which, when joined logically together, comprise the identified engine/module and achieve the stated purpose of the identified engine/module. Indeed, an engine or a module of executable code may be a single instruction, or many instructions, and may even be distributed over several different code segments, among different applications, and across several memory devices.

As will be appreciated by one skilled in the art, a variety of processes may be employed for component level data management in web applications. For example, the exemplary system 100 and associated data management device 102 may manage data at component level in web applications, by the process discussed herein. In particular, as will be appreciated by those of ordinary skill in the art, control logic and/or automated routines for performing the techniques and steps described herein may be implemented by the system 100 and the associated data management device 102 either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all the processes described herein may be included in the one or more processors on the system 100.

Figure 3:
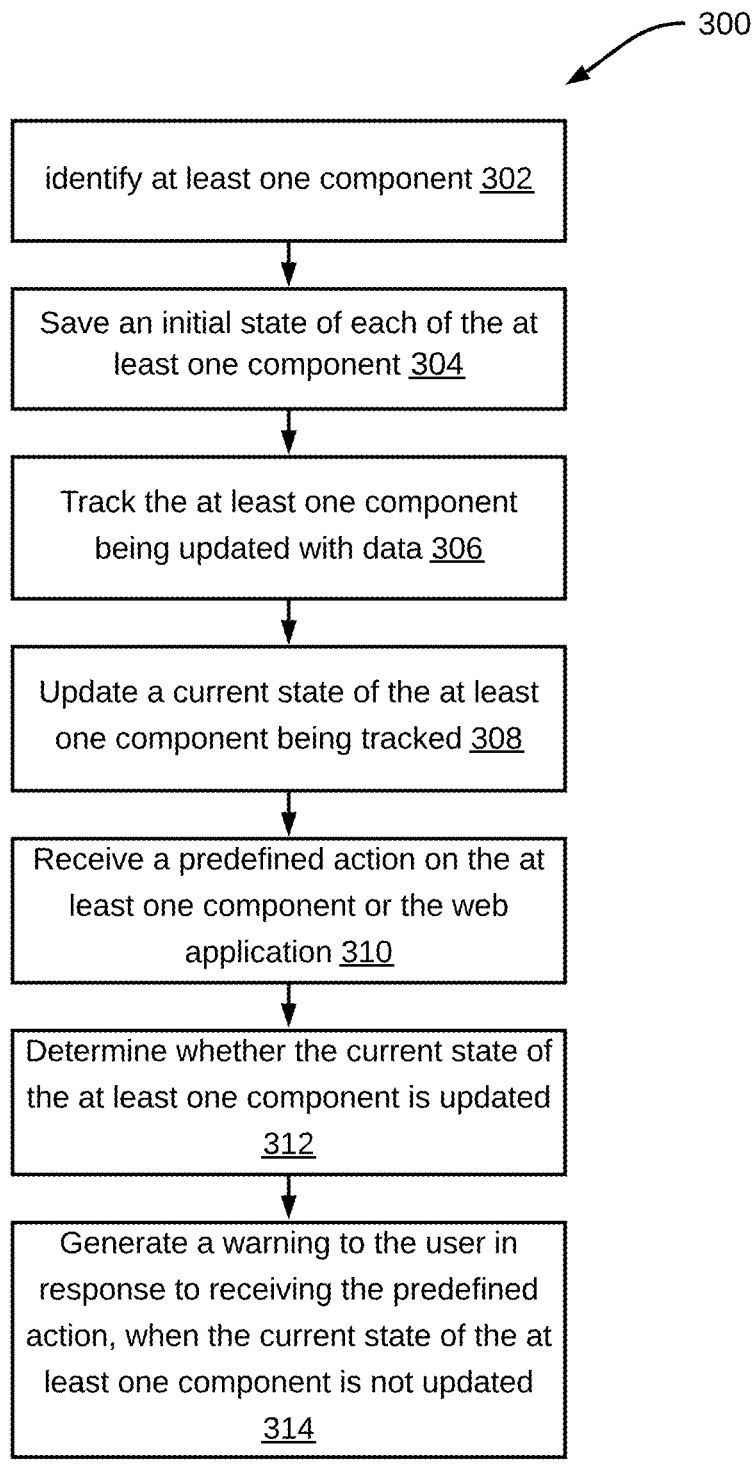
FIG. 3 is a flowchart of a method for component level data management in web applications, in accordance with an embodiment.

Referring now to FIG. 3, a method for component level data management in web applications is depicted via a flowchart 300, in accordance with an embodiment. Each step of the method may be executed by the data management device 102. At step 302, at least one component within a web application may be identified. At step 304, an initial state of the at least one component may be saved. It should be in noted that a Redux store (for example, the Redux store 206) may be used to save the initial state of the at least one component. The Redux store may be used with a framework including at least one of REACT, ANGULAR, VUE, EMBER, OR VANILLA JAVASCRIPT. This has already been explained in detail in conjunction with FIG. 2

At step 306, the at least one component may be tracked. In an embodiment, the tracked at least one component may currently be in the process of being updated with data by a user. At step 308, a current state of the at least one component being tracked is updated in the Redux store. It should be noted that the current state of the at least one component incudes the data updated by the user.

At step 310, a predefined action on the at least one component or the web application may be received. The predefined action may include, but is not limited to navigating from a current page to another page within the web application, redirecting to an initial page, leaving one or more data fields blank in the at least one component, applying an inappropriate format to fill the one or more data fields, directly closing a tab or a browser in the web application, activating browser reload buttons, or activating browser back and forth buttons.

At step 312, it may be determined whether the current state of the at least one component is updated in the Redux store or not. Such determination may be performed in response to receiving the predefined action at step 310. At step 314, a warning may be generated to the user in response to receiving the predefined action. It should be noted that the data management device 102 may generate the warning, when the current state of the at least one component is not updated in the Redux store. This has already been explained in detail in conjunction with FIG. 2

Figure 4:
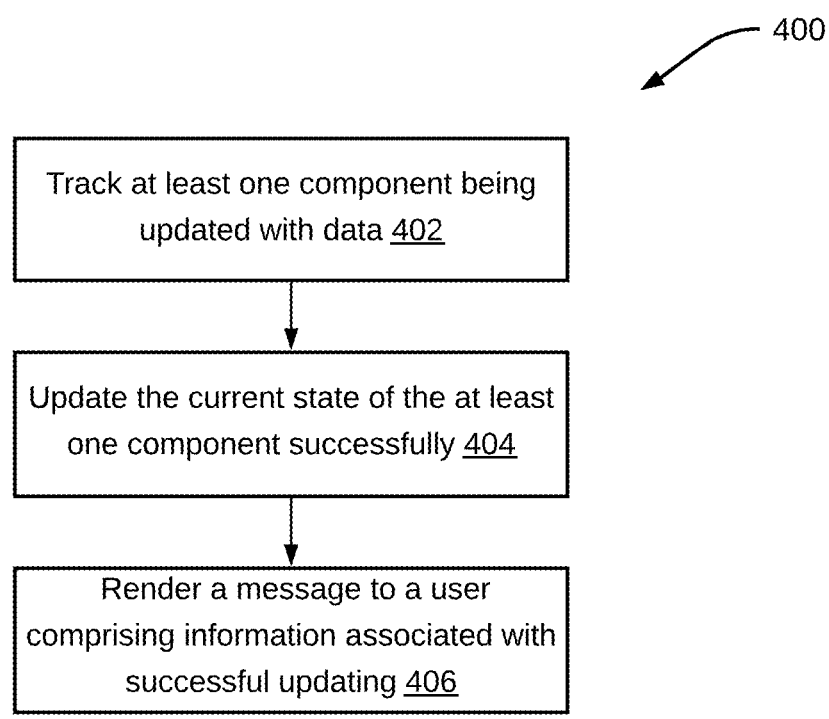
FIG. 4 is a flowchart of a method for rendering a message to a user in response to tracking updates on components, in accordance with an embodiment.

Referring now to FIG. 4, a method for rendering a message to a user in response to tracking updates on components is depicted via a flowchart 400, in accordance with an embodiment. At step 402, at least one component with that is being updated with data by a user may be tracked. At step 404, a current state of the at least one component being tracked may be updated successfully, in real-time. It should be noted that a Redux store (for example, the Redux store 206) may be used for updating the current state of the at least one component. The current state of the at least one component may include the data updated by the user. At step 406, a message may be rendered to the user and the message may include information associated with successful updating of the current state of the at least one component in the Redux store.

Figure 5:
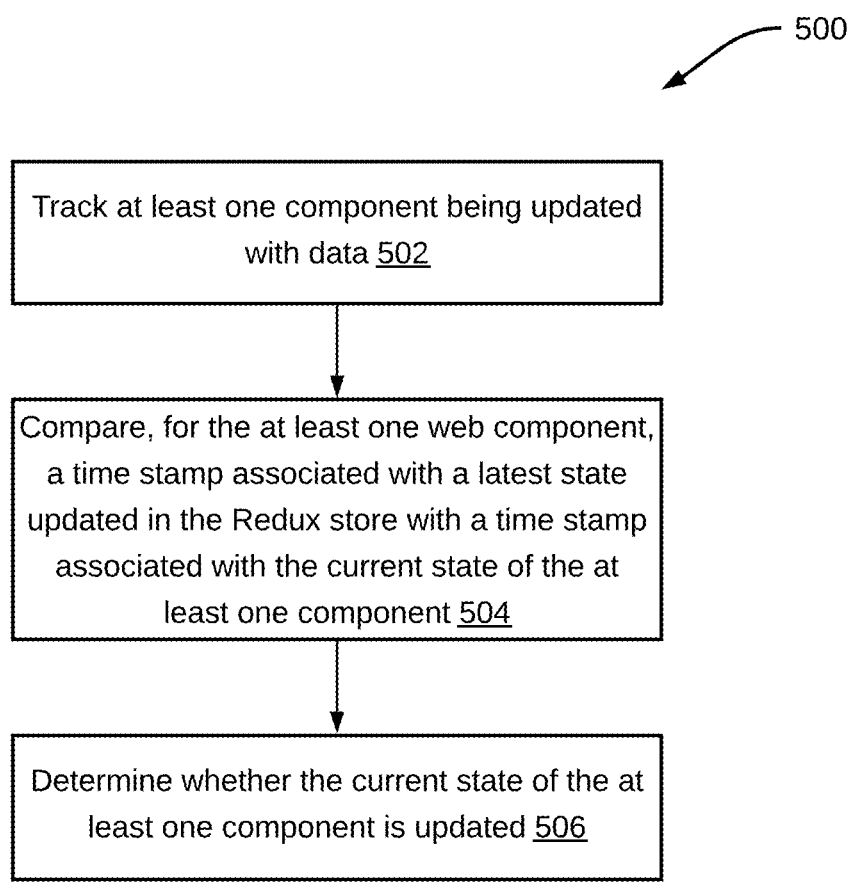
FIG. 5 is a flowchart of a method for determining updating of the current state of at least one component, in accordance with an embodiment.

Referring now to FIG. 5, a method for determining updating of the current state of at least one component is depicted via a flowchart 500, in accordance with an embodiment. At step 502, at least one component being updated with data by a user may be tracked. Further, at step 504, a comparison may be performed for the at least one web component. The comparison may be performed between a time stamp associated with a latest state updated for the at least one web component in the Redux store and a time stamp associated with the current state of the at least one component. In an embodiment, the comparison may be performed in response to receiving the predefined action. The predefined action may include, but is not limited to navigating from a current page to another page within the web application, redirecting to an initial page, leaving one or more data fields blank in the at least one component, applying an inappropriate format to fill the one or more data fields, directly closing a tab or a browser in the web application, activating browser reload buttons, or activating browser back and forth buttons.

Based on the comparison, at step 506 it may be determined whether the current state of the at least one component is updated in the Redux store or not. If the time stamps of the latest state updated in the Redux store matches with the time stamp associated with the current state of the at least one component, it may be determined that the Redux store is updated for the at least one component. However, if the time stamps of the latest state updated in the Redux store does not match with the time stamp associated with the current state of the at least one component, it may be determined that the Redux store is not updated for the at least one component.

Figure 6:
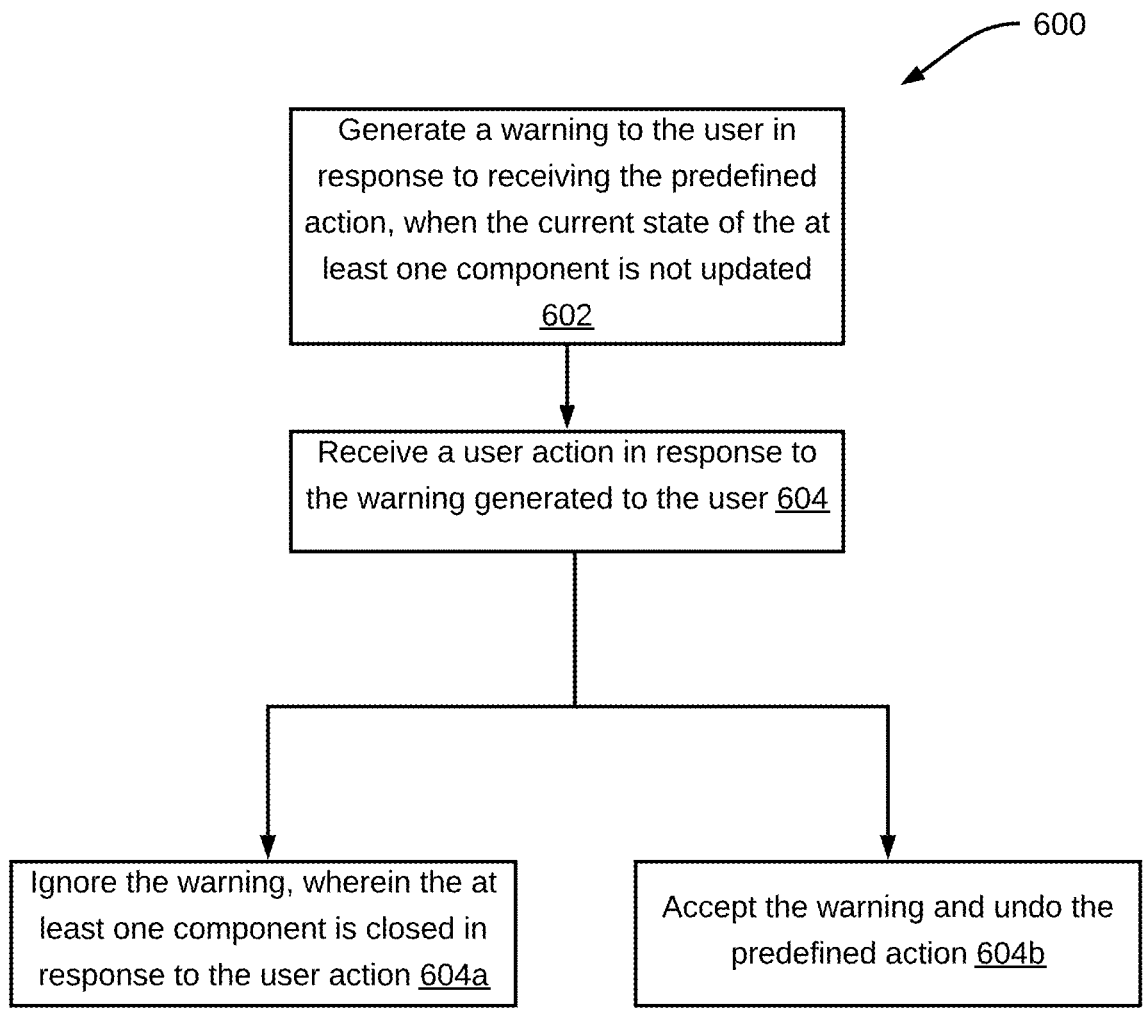
FIG. 6 is a flowchart of a method for performing a user action upon generation of a warning, in accordance with an embodiment.

Referring now to FIG. 6, a method for performing a user action upon generation of a warning is depicted via a flowchart 600, in accordance with an embodiment. At step 602, a warning may be generated in response to receiving a predefined action from a user. The warning may be received when the current state of the at least one component is not updated in a Redux store (for example, the Redux store 206). The predefined action may include, but is not limited to navigating from a current page to another page within the web application, redirecting to an initial page, leaving one or more data fields blank in the at least one component, applying an inappropriate format to fill the one or more data fields, directly closing a tab or a browser in the web application, activating browser reload buttons, or activating browser back and forth buttons. It should be noted that the warning may be further transmitted to a user. For example, when the current state of the at least one component is not updated in the Redux store, the data management device 102 may generate a warning and send it to the user.

At step 606, a user action may be received in response to the warning generated to the user. This may further include two sub-steps. At step 606a, the warning may be ignored by the user. In response to the user ignoring the warning, the at least one component is closed and the current state of the at least one component is updated in the Redux store (for example, the Redux store 206). At step 606*b*, however, the user may accept the waring and may undo the predefined action.

Figure 7:
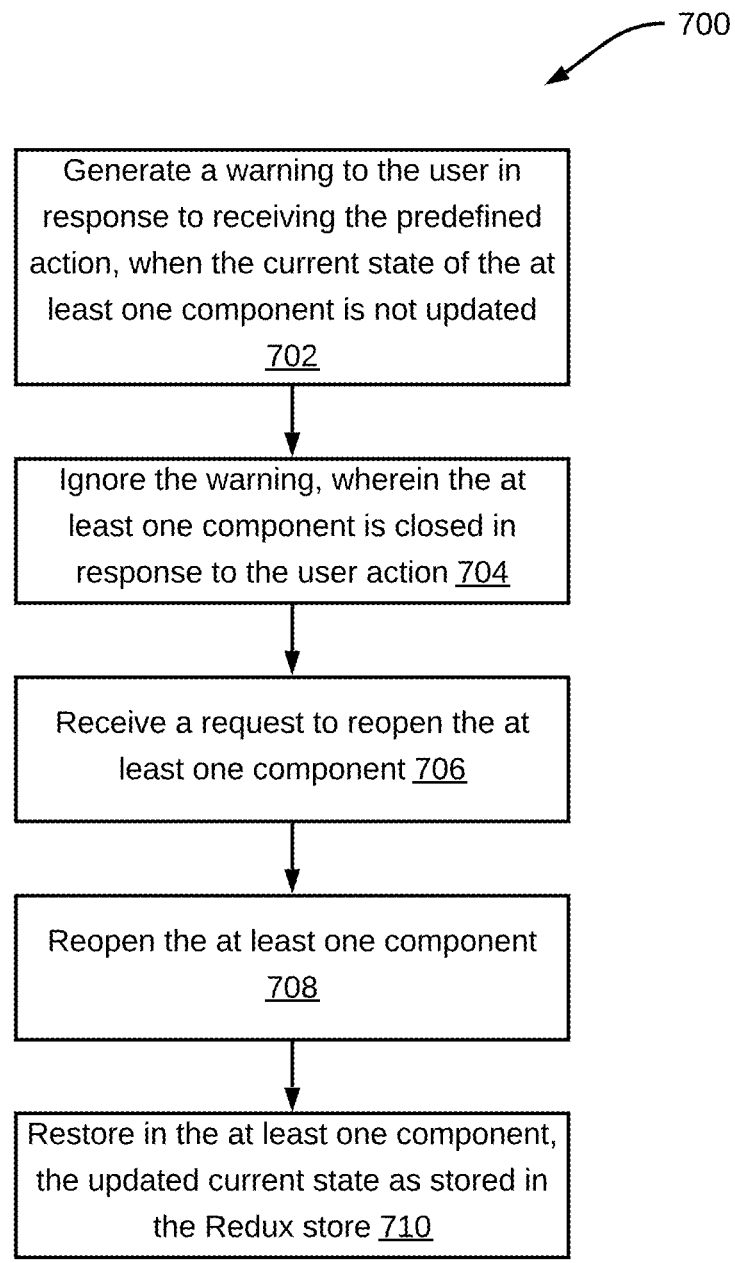
FIG. 7 is an flowchart of a method for restoring updated current state in at least one component, in accordance with an embodiment.

Referring now to FIG. 7, a method 700 for restoring updated current state of at least one component is depicted via a flowchart 700, in accordance with an embodiment. At step 702, a warning may be generated to a user in response to receiving a predefined action from the user, when the current state of the at least one component is not updated in a Redux store (for example, the Redux store 206). Further, at step 604, the user may ignore the warning. As a result, the at least one component may get closed in response to the user action.

At step 706, a request to reopen the at least one component may be received by the data management device 102. At step 708, the at least one component may be reopened. In other words, the data management device 102, upon receiving a request from the user, may again open the at least one component closed earlier when the warning was ignored. Thereafter, at step 710, the updated current state as stored in the Redux store may be restored in the at least one component. By way of an example, if a user had filled some details in a component of an web based form and the user closed the form or the component and also accidently ignored the warning of unsaved data. In such case, when the user subsequently opens the web based form, the details provided by the user may automatically be restored.

Referring now to FIG. 8, an exemplary scenario depicting restoration of dirty or unsaved data in a component within a web application 800 on premature closure of the component is illustrated, in accordance with an exemplary embodiment. The web application 800 may include three components, for example, a first component 802, a second component 804, and a third component 806. Further, each of the three components 802, 804, and 806, may include various data fields that may be filled by a user. It will be apparent to a person skilled in the art that though each of the three components 802, 804, and 806 are displayed on a single page, in an embodiment, these may be rendered on separate and/or sequential web pages to a user and the user may be able to access only one component at a given time. The first component 802 may include login details. By way of an example, the first component may include two data fields 802*a* and 802*b*, i.e., a username field and a password field, respectively.

Consider a situation where the first component 802 is a parent component and the second and third components 804 and 806 are child components. The user may be able to access the second and third components 804 and 806 only after entering correct details in the data fields 802*a* and 802*b*. Further, the user may be capable of switching from the second component 804 to the third component 806 as well as from the third component 806 to the second component 804. It may be noted that the second component 804 may include basic details, and the third component 806 may include additional details associated with the user or the user's choice.

As illustrated in the FIG. 8, initially, the user may fill details in the data fields 802*a* and 802*b*, such as, the username 'XYZ' and the password '@123abc.' After filling the details in the data fields 802*a* and 802*b*, the user may press a 'Login' key provided in the first component 802 in order to access the second and the third components 804 and 806. After pressing the login button, the user may fill data fields of the second component 804 first, as depicted in FIG. 8. In some other embodiments, the user may first fill the third component 806, followed by the second component 804.

Additionally, in some embodiments, the user may iteratively or continuously switch between the second component 804 and the third component 806. By way of an example, the user may want to check various data fields in the third component 806 while filling details in data fields of the second component 804. By way of another example, while filling details in data fields of the second component 804, the user may accidently activate back and forth buttons of the browser, thereby traversing either to the first component 802 or the third component 806.

Further, the third component 806 may also have 'Save' and 'Reset' buttons. In some embodiment, the second component 804 may also have the 'Save' and 'Reset' buttons. In addition to the 'Save' and the 'Reset' buttons, the third component 806 may also include a 'Submit' key. The user may use the 'Save' button for storing information filled in data fields, and the 'Reset' key to reset the data fields. It may be noted that for a final submission of information provided in the second and third components 804 and 806, the user must press or touch the 'Submit' button provided in the third component 806.

A data management device (for example, the data management device 102) associated with the web application 800 may continuously store the current state of each of the components 802, 804, and 806 in a Redux store (for example, the Redux store 206). This has already been explained in detail in conjunction with FIG. 2 to FIG. 7. Additionally, the data management device may also generate warnings, when a user has not provided data for all data fields in a given component. Such incomplete data may also be termed as dirty data that may not have been updated in the Redux store yet, by the data management device.

By way of an example and with reference to the FIG. 8, the web application 800 may be for registering users who are interested in learning one or more musical instruments. After logging in, a user may provide his/her basics details in the second component 804. As and when the user provides the details, the data management device may keep updating the Redux store with the current state of the second component 804. However, before providing address details and without pressing the "Save" button, the user may navigate to the third component 806 in order to check which musical instruments can be selected and what days are available for attending classes.

Since the user has not yet saved the data already provided in various data fields of the second component 804, the already provided data is dirty data. However, the data management device of the current invention may have already updated the Redux store with details provided by the user in the second component 804. The data management device in a similar manner may update current state of the first component 802 and the third component 806. In other words, current state of each of these components may be separately and independently updated in the Redux store. Thus, when the user may traverse back to the second component 804, the data that the user had already provided, may be restored by the data management device, based on the latest state of the second component 804 as stored in the Redux store. As a result, the user may not have to again provide the same data that he/she had already provided before traversing to the third component 806. In addition to updating the Redux store, the data management device may also generate a warning, when the user navigates to the third component 806 without providing the address details and without saving the already provided data in the second component 804.

Various embodiments provide method and system for component level data management in web applications. The disclosed method and system may help in tracking state of each component of a web application in a continuous manner and may store the tracked state for each such component separately and independently in a Redux store. The disclosed data management device may speed-up development time and may ensure that data as well as state management is consistent throughout the web application. Further, the data management device may maintain various states or may capture snapshots of various states of multiple components. Also, the data management device may prevent effect of external or internal operations on a dirty component in which data has not been saved. The data management device employs a common presentation layer for a user about possibility of state loss. Thus, unnecessary warnings may not be generated.

It will be appreciated that, for clarity purposes, the above description has described embodiments of the invention with reference to different functional units and processors. However, it will be apparent that any suitable distribution of functionality between different functional units, processors or domains may be used without detracting from the invention. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Although the present invention has been described in connection with some embodiments, it is not intended to be limited to the specific form set forth herein. Rather, the scope of the present invention is limited only by the claims. Additionally, although a feature may appear to be described in connection with particular embodiments, one skilled in the art would recognize that various features of the described embodiments may be combined in accordance with the invention.

Furthermore, although individually listed, a plurality of means, elements or process steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather the feature may be equally applicable to other claim categories, as appropriate.

What is claimed is:

1. A method for component level data management in web applications, the method comprising:
    identifying each of at least one component within a web application;
    saving an initial state of each of the at least one component in a state managing store;
    tracking each of the at least one component being updated with data by a user;
    updating, in real-time, a current state of each of the at least one component being tracked, separately and independently in the state managing store for the component level data management in the web application, wherein the current state of each of the at least one component comprises the data updated by the user, and wherein updating comprises:
        capturing at least one snapshot of each of the current state and the initial state corresponding to each of the at least one component;
    receiving a predefined action on a component from the at least one component or the web application;
    determining that the current state of each of the at least one component is updated in the state managing store, in response to receiving the predefined action;
    rendering a warning to the user in response to receiving the predefined action and in response to determining that the current state of each of the at least one component is not updated in the state managing store;
    receiving a user action to close the warning in response to the warning rendered to the user, wherein each of the at least one component is closed in response to the user action;
    receiving a request from the user to reopen one of the at least one component;
    reopening the at least one component, in response to receiving the request from the user; and
    restoring dirty data in the at least one component within the web application on a premature closure of the at least one component, to a state unaffected by any external or internal operations on the dirty data in the at least one component, wherein the dirty data corresponds to already provided data in one or more data fields of the at least one component that is unsaved by the user in the at least one component, and wherein the dirty data is stored as updated current state in the state managing store.

2. The method of claim 1, further comprising rendering a message to a user comprising information associated with successful updating of the current state of the at least one component in the state managing store.

3. The method of claim 1, wherein the predefined action comprises navigating from a current page to another page within the web application, redirecting to an initial page, leaving one or more data fields blank in the at least one component, applying an inappropriate format to fill the one or more data fields, directly closing a tab or a browser in the web application, activating browser reload buttons, or activating browser back and forth buttons.

4. The method of claim 1, wherein determining that the current state of each of the at least one component is updated in the state managing store comprises comparing, for each of the at least one component, a time stamp associated with a latest state updated in the state managing store with a time stamp associated with the current state of each of the at least one component.

5. The method of claim 1, wherein the user action comprises undoing the predefined action in response to the warning.

6. The method of claim 1, wherein the captured snapshots of each of the current state and the initial state corresponding to each of the at least one component are stored in the state managing store.

7. A non-transitory computer-readable medium for component level data management in web applications, having stored thereon, a set of computer-executable instructions causing a computer comprising one or more processors to perform steps comprising:
    identifying each of at least one component within a web application;
    saving an initial state of each of the at least one component in a state managing store;
    tracking each of the at least one component being updated with data by a user;

updating, in real-time, a current state of each of the at least one component being tracked, separately and independently in the state managing store for the component level data management in the web application, wherein the current state of each of the at least one component comprises the data updated by the user, and wherein updating comprises:

capturing at least one snapshot of each of the current state and the initial state corresponding to each of the at least one component;

receiving a predefined action on each of the at least one component or the web application; determining that the current state of each of the at least one component is updated in the state managing store, in response to receiving the predefined action;

rendering a warning to the user in response to receiving the predefined action and in response to determining that the current state of each of the at least one component is not updated in the state managing store, receiving a user action to close the warning in response to the warning rendered to the user, wherein each of the at least one component is closed in response to the user action;

receiving a request from the user to reopen one of the at least one component; reopening the at least one component, in response to receiving the request from the user; and restoring dirty data in the at least one component within the web application on a premature closure of the at least one component, to a state unaffected by any external or internal operations on the dirty data in the at least one component, wherein the dirty data corresponds to already provided data in one or more data fields of the at least one component that is unsaved by the user in the at least one component, and wherein the dirty data is stored as updated current state in the state managing store.

8. A system for component level data management in web applications, the system comprising:

a processor; and a memory communicatively coupled to the processor, wherein the memory stores processor-executable instructions, which, on execution, causes the processor to:

identify each of at least one component within a web application;

save an initial state of each of the at least one component in a state managing store;

track each of the at least one component being updated with data by a user;

update, in real-time, a current state of each of the at least one component being tracked, separately and independently in the state managing store for the component level data management in the web application, wherein the current state of each of the at least one component comprises the data updated by the user, and wherein updating comprises:

capturing at least one snapshot of each of the current state and the initial state corresponding to each of the at least one component;

receive a predefined action on a component from the at least one component or the web application;

determine that the current state of each of the at least one component is updated in the state managing store, in response to receiving the predefined action;

render a warning to the user in response to receiving the predefined action and in response to determining that the current state of each of the at least one component is not updated in the state managing stores;

receive a user action to close the warning in response to the warning rendered to the user, wherein each of the at least one component is closed in response to the user action;

receive a request from the user to reopen one of the at least one component;

reopen the at least one component, in response to receiving the request from the user; and restore dirty data in the at least one component within the web application on a premature closure of the at least one component, to a state unaffected by any external or internal operations on the dirty data in the at least one component, wherein the dirty data corresponds to already provided data in one or more data fields of the at least one component that is unsaved by the user in the at least one component, and wherein the dirty data is stored as updated current state in the state managing store.

9. The system of claim 8, wherein the processor-executable instructions further cause the processor to render a message to a user comprising information associated with successful updating of the current state of the at least one component in the state managing store.

10. The system of claim 8, wherein the predefined actions comprises navigating from a current page to another page within the web application, redirecting to an initial page, leaving one or more data fields blank in the at least one component, applying an inappropriate format to fill the one or more data fields, directly closing a tab or a browser in the web application, activating browser reload buttons, or activating browser back and forth buttons.

11. The system of claim 8, wherein the processor determines that the current state of each of the at least one component is updated in the state managing store, by:

comparing, for each of the at least one component, a time stamp associated with a latest state updated in the state managing store with a time stamp associated with the current state of each of the at least one component.

12. The system of claim 8, wherein the user action comprises undoing the predefined action in response to the warning.

13. The system of claim 8, wherein the captured snapshots of each of the current state and the initial state corresponding to each of the at least one component are stored in the state managing store.

\* \* \* \* \*